United States Patent [19]

Wormser

[11] 4,051,791

[45] Oct. 4, 1977

[54] COAL BURNING ARRANGEMENT

[75] Inventor: Alex F. Wormser, Marblehead, Mass.

[73] Assignee: Wormser Engineering, Inc., Marblehead, Mass.

[21] Appl. No.: 604,923

[22] Filed: Aug. 15, 1975

[51] Int. Cl.$^2$ .................... F23D 19/00; F23C 5/16; F23D 1/00

[52] U.S. Cl. ................ 110/28 R; 110/28 J; 201/31

[58] Field of Search .............. 110/8 F, 28 J, 28 R; 201/31

[56] References Cited

U.S. PATENT DOCUMENTS

| | | | |
|---|---|---|---|
| 2,903,980 | 9/1959 | Gorin | 110/28 |
| 3,070,515 | 12/1962 | Sylvander | 201/31 |
| 3,358,624 | 12/1967 | Way | 110/28 |
| 3,671,402 | 6/1972 | Wenzel et al. | 201/31 |
| 3,694,346 | 9/1972 | Blaser et al. | 201/31 |
| 3,727,562 | 4/1973 | Bauer | 110/28 |
| 3,929,585 | 12/1975 | Grimmett | 201/31 |

Primary Examiner—Kenneth W. Sprague

[57] ABSTRACT

Pyrolyzing pulverized coal to form char and volatiles, separating the char from the volatiles, burning the char in heat-transfer relationship with a stoichiometric excess of air, forming thereby ash and a mixture of gases, the excess of air being chosen to produce in the ash a temperature below the fusion temperature thereof, separating the mixture of gases from the ash, and thereafter burning the volatiles in the mixture of gases. Also, coal burning apparatus which comprises, in combination a spouted bed pyrolyzer, a fluidized bed combustor, a first cyclone, a second cyclone, and an afterburner, the pyrolyzer being connected to accept pulverized coal and to discharge char to the combustor and gaseous materials with entrained particulate material to the first cyclone, the first cyclone being connected to deliver gases to the afterburner, the combustor being connected to accept also a combustion supporting gas and to deliver to the second cyclone gaseous materials with entrained particulate material, and the second cyclone being connected to deliver gaseous material to the afterburner.

20 Claims, 8 Drawing Figures

FIG 2

| LINES (FIG.1) | PYROLYZER FEEDS 10 | CHAR CYCLONE FEED 14 | VOLATILE MATTER 18 | COARSE CHAR 22 | FINE CHAR 26 | BURNER CHAR FEED 24 | COMBUSTION AIR 30 | CYCLONE ASH FEED 34 | ASH & SPENT LIMESTONE 40+42 | ASH HOPPER FEED 44 | WARM PRODUCTS OF COMBUSTION 46 | HOT P.O.E. & FURNACE FEED 48 |
|---|---|---|---|---|---|---|---|---|---|---|---|---|
| TEMPERATURE, °F | 60 | 1600 | 1600 | 1600 | 1600 | 1500 | 60 | 1570 | 1570 | 500 | 1570 | 3000 |
| ASH & SPENT LIMESTONE, LBS/HR | | | | | | | | 60 | 320 | 320 | | |
| BLOWER AIR, LBS/HR | 930 | | | | | | 9010 | | | | | |
| TRANSPORT AIR, LBS/HR | 90 | 20 | | 80 | 20 | 50 | | | | 30 | | |
| COAL, LBS/HR | 930 | | | | | | | | | | | |
| LIMESTONE, LBS/HR | 180 | | | | | 100 | | | | | | |
| PRODUCTS OF COMBUSTION, LBS/HR | | 1200 | 1200 | | | | | 9260 | | | 9260 | 10,860 |
| VOLATILES, LBS/HR | | 400 | 400 | | | | | | | | | |
| CHAR, LBS/HR | | 80 | | 340 | 80 | 420 | | | | | | |
| TOTAL FLOW, LBS/HR | 2130 | 1700 | 1600 | 420 | 100 | 570 | 9010 | 9320 | 320 | 350 | 9260 | 10,860 |

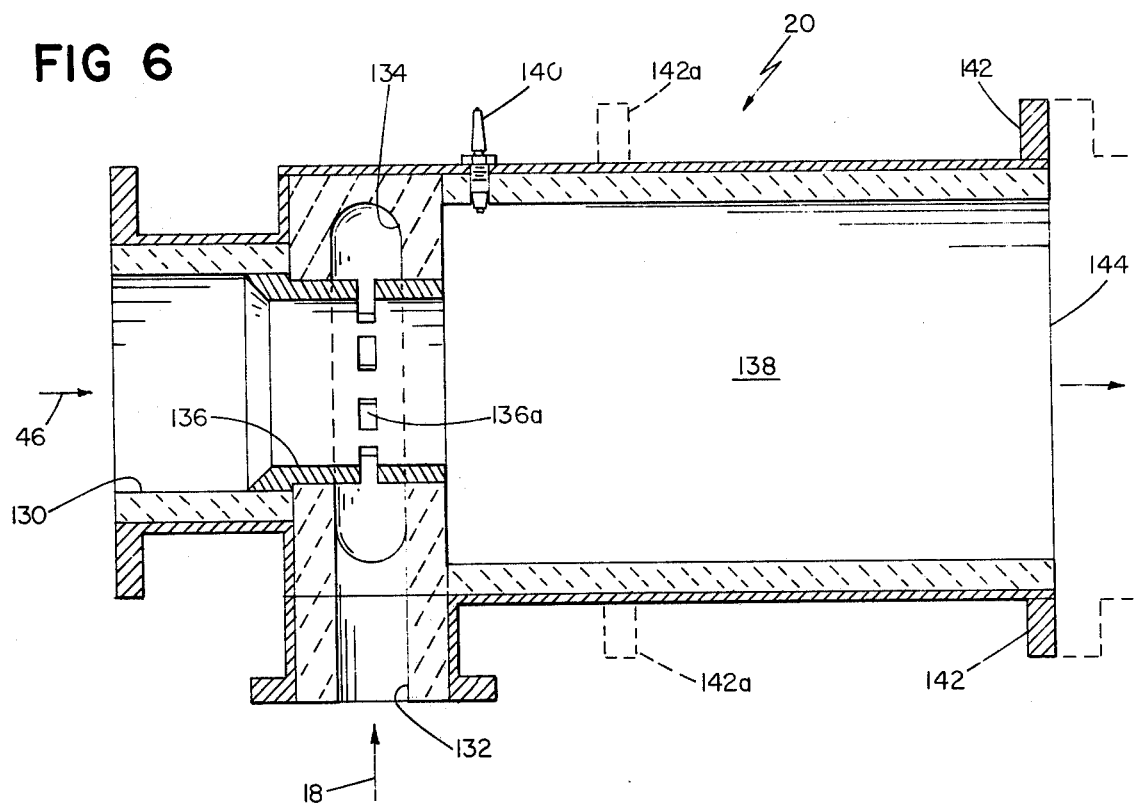
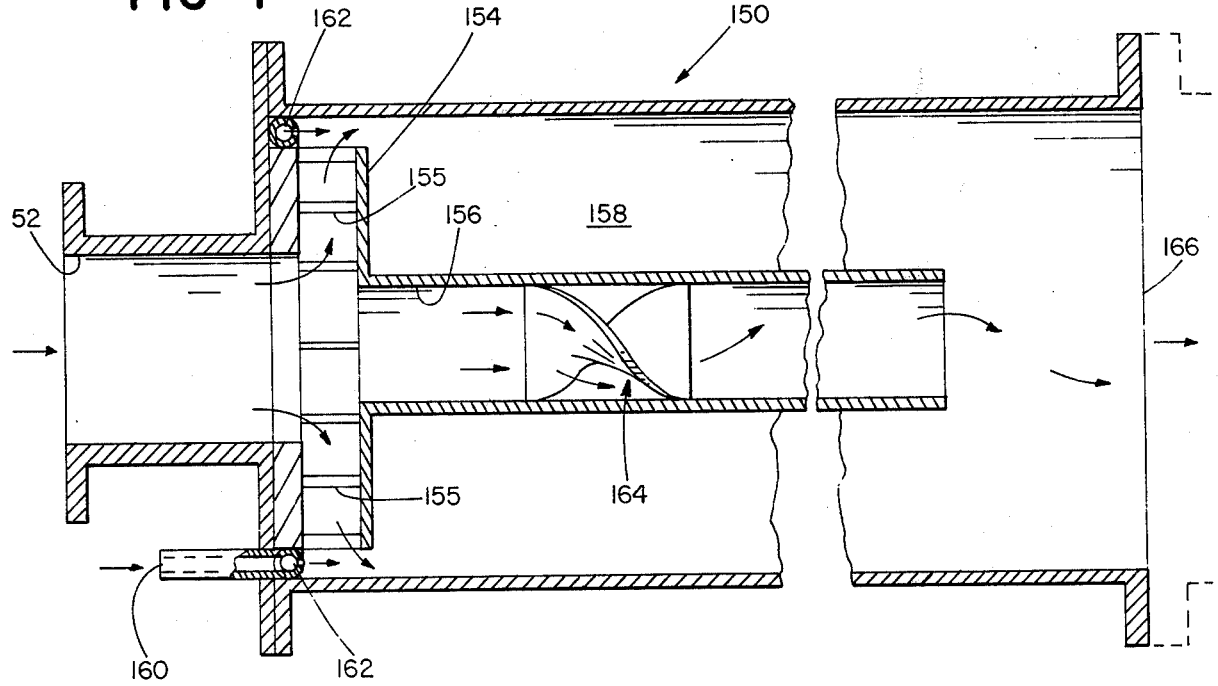

COAL BURNING ARRANGEMENT

BACKGROUND OF THE INVENTION

This invention relates to burning powdered coal.

The advantages of coal as an energy source need no elaboration here, at this historical juncture. However, burning coal has also had its disadvantages: initial handling, handling of waste products of combustion, equipment corrosion, and pollution.

In recent years, fluidized bed combustors have been developed that solve most of these problems. In particular, desulfurization of high-sulfur coals by limestone addition to the combustor is done more reliably and cheaply in fluid bed combustors than by stack-gas scrubbers, which are still unproven. Particulates may also be removed more cheaply from fluidized bed combustors than from conventional coal burners, by substituting low-cost cyclone separators for expensive electrostatic precipitators. Cyclones can be used with fluid beds because of the ash-coarsening agglomeration that occurs, as is shown in Godel U.S. Pat. No. 3,431,892 and Stephens et al U.S. Pat. No. 3,171,369. The emission of noxious trace elements, (e.g., beryllium, cadmium, and mercury) is minimized in fluidized beds by their far-lower operating temperature.

Yet, the low outlet temperatures of conventional fluidized beds outlet gases cannot be used to provide heat for high-temperature furnaces. Such low temperatures also create excessive stack-gas losses if conventional fluidized-bed combustors are retrofitted to existing boilers and space-heating furnaces. The present invention overcomes these objections by providing a system with high outlet temperatures that nevertheless permits the char combustor to be operated at low temperatures. One prior art system that also produces outlet temperatures appreciably higher than the char-burner temperature is found in Way U.S. Pat. No. 3,358,624. The system used a pyrolyzer to separate coal into char and volatiles, a burner for the char cooled by excess air, but only to keep the ash molten so that it will form as slag on the walls rather than be vaporized, and a second burner for the volatiles and combustion products and excess air of the first burner, giving a high output temperature.

Numerous pyrolyzers have been developed over the years to remove volatiles from coal. One requirement is for a pyrolyzer that can handle caking coals without fouling. The design perfected by the U.S. Bureau of Mines (Bureau of Mines Report of Investigation 7843, 1973), is particularly suitable for the needs of the present invention. The design has been modified to withdraw solid materials in a standpipe, instead of by gas entrainment from the top, thereby reducing particle attrition; this modification is suggested in "Spouted Beds," Kishan B. Mathur, Norman Epstein, Academic Press, New York, 1974.

Another problem with conventional fluidized bed combustors relates to the large freeboard volume which is required to assure the complete burnout of burning particles. The large space contributes significantly to the burner size and cost, and can be reduced by introducing the still-burning particles into a swirling space. This technique has been taught in oil burners in Cox, Editor, "Gas Turbines Principles and Practices." (George Newes, Ltd., London, 1955, p. 17-14 and -15).

SUMMARY OF THE INVENTION

The invention makes possible burning coal with great efficiency and with very greatly reduced corrosion, pollution, and products handling problems, all with simplicity, capability of automatic operation, and adaptability to the widest range of installation sizes. Either wet or dry crushed coal, with or without additives, may be burned. Combustion is quiet and uniform, and at a closely controllable buring temperature; and near stoichiometric flame temperatures are achieved with little excess oxygen. Even fine fly ash is removed, along with sulfur, with great efficiency; and there is minimum formation of trace elements and $NO_x$ compounds. Corrosion of equipment is minimized. Retrofitting existing equipment is practical. Altogether, the invention promises to be the lowest cost method of using coal in an environmentally acceptable manner in high temperature furnaces and in boilers retrofitted from other fuels.

The invention features pyrolyzing pulverized coal to form char and volatiles, separating the char from the volatiles, burning the char in heat-transfer relationship with a stoichiometric excess of air, forming thereby ash and a mixture of gases, the excess of air being chosen to produce in the ash a temperature below the fusion temperature thereof, separating the mixture of gases from the ash, and thereafter burning the volatiles in the mixture of gases.

The invention also features coal burning apparatus which comprises, in combination, a spouted fluidized bed pyrolyzer, a fluidized bed combustor, a first cyclone, a second cyclone, and an afterburner, the pyrolyzer being connected to accept pulverized coal and to discharge char to the combustor and gaseous materials with entrained particulate material to the first cyclone, the first cyclone being connected to deliver gases to the afterburner, the combustor being connected to accept also a combustion supporting gas and to deliver to the second cyclone gaseous materials with entrained particulate material, and the second cyclone being connected to deliver gaseous material to the afterburner.

In preferred embodiments, the invention features also bringing the stoichiometric excess of air into contact with the char in pyrolyzing, providing in the pyrolyzer specific characteristics, carrying out the solid-gas separations in cyclones, burning char in a solids-recirculating fast fluidized bed combustor, providing in the combustor specific characteristics, providing heat in the pyrolyzer by burning therein a portion of the combustibles thereinto, varying fusion temperature by adding a temperature varying material, adding a diluent gas to volatiles before burning them, adding water at the pyrolyzer, adding sorbent at the pyrolyzer, and adding oil at the afterburner.

Other advantages and features of the invention will be apparent from the description and drawings herein of preferred embodiments thereof.

BRIEF DESCRIPTION OF THE DRAWINGS

FIG. 2 is a table showing temperatures and throughputs at various places in said embodiment;

FIG. 6 is a vertical sectional view of the afterburner preferred for use therein;

FIG. 7 is a vertical sectional view of the preheaters preferred for use therein.

DESCRIPTION OF THE PREFERRED EMBODIMENT

Figure 1:
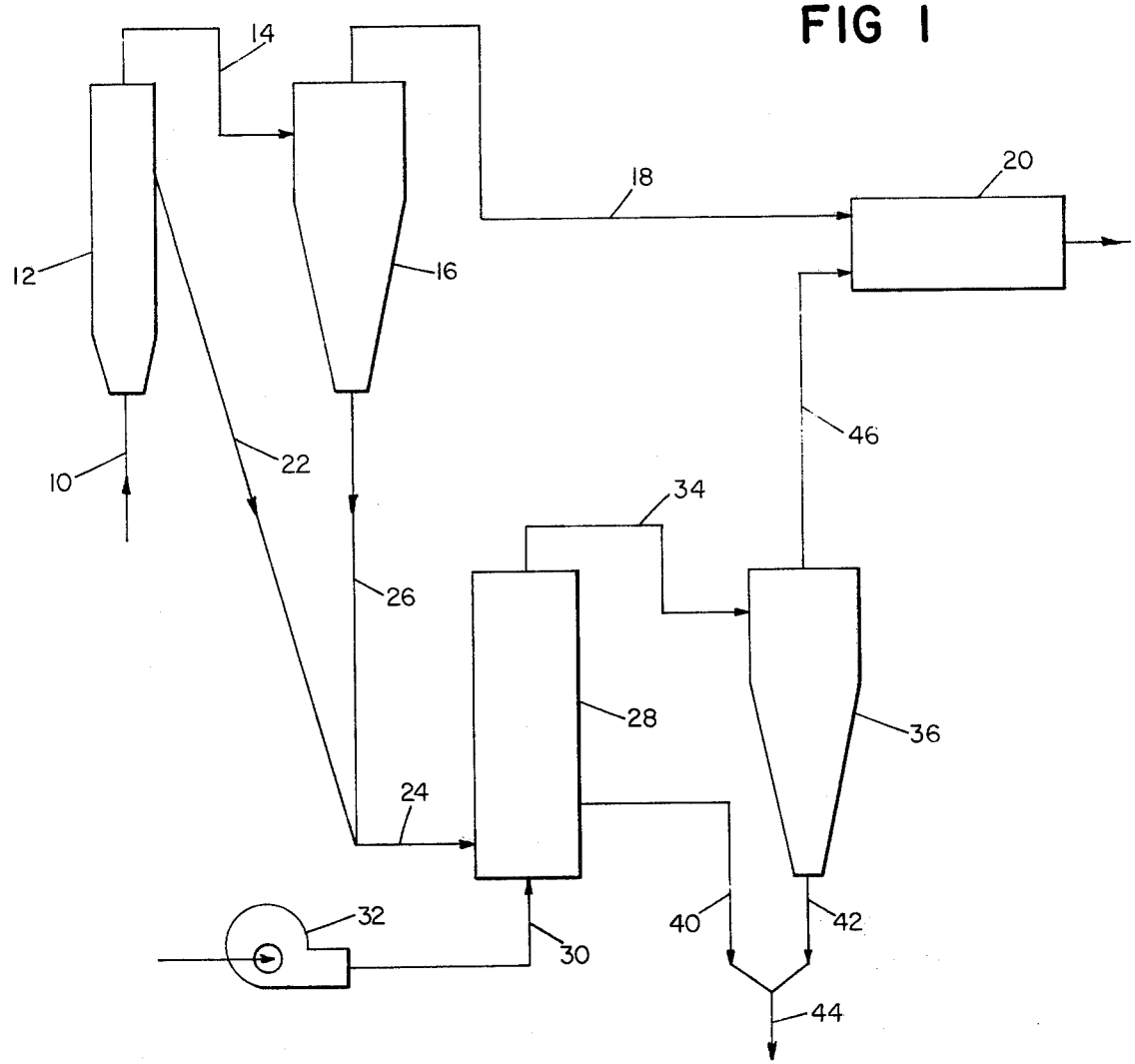
FIG. 1 is a diagrammatic flow chart illustrating a preferred embodiment of the invention.

Turning now to my presently preferred embodiment, and describing it in a manner enabling to those skilled in the art, there is shown in FIG. 1 a diagrammatic flow chart illustrating a combination of elements arranged to burn coal according to my novel invention.

In this embodiment, I burn Illinois high volatile bituminous Grade B coal with 3.0% sulfur content, ash content of 10.5%, and a heating value of 11,300 BTU/lb. The coal is dried and crushed to pass 8 mesh at the mine.

Dry limestone crushed to pass 8 mesh is mixed (not shown) with the coal just upstream of mixed-coal-and-limestone feed line 10 (FIG. 1), by dropping each from its separate screw feeder into a venturi for transport air (not shown), the two venturis discharging into a common zone. Downstream of this, but just upstream of feed line 10, bleed air is introduced. (The compressor for the transport air has a capacity of 40 psi, and supplies the transport air for each purpose hereinafter mentioned. The blower for the bleed air has a capacity of 2 psi). Coal, limestone, transport air, and bleed air enter pyrolyzer 12 through line 10.

Gaseous products move through refractory lined line 14 into char cyclone 16, which removes entrained particles. The cleaned gases are then introduced through refractory lined line 18 into afterburner 20. Most of the char produced in pyrolyzer 12 passes through standpipe 22 into inlet line 24. The char discharged from cyclone 16 through line 26 also enters line 24. (A venturi in each of line 22 and 26, each cooperating with transport air from the transport air compressor, blows the two together in a Y the single outlet of which is line 24; venturis and compressors are not shown.) Line 24 discharges into fast fluidized-bed combustor 28, which serves as the preferred char burner. Also discharging into the fast fluidized-bed combustor (transfer line reactor with solids recirculation) 28 is combustion air blown through line 30 by blower 32.

All the products of combustion, nitrogen, and remaining oxygen flow through refractory lined line 34 into ash cyclone 36, in which most of the ash (with spent limestone) is removed through line 42. Most of the residue (ash & spent limestone) leaving the fluid bed combustor 28 does so through standpipe 40. Residue leaving through standpipe 40 is mixed with residue leaving ash cyclone 36 through line 42, each of lines 40 and 42 including a venturi (not shown) cooperating with transport air, mixed residue emerging in line 44. Hot gases leave ash cyclone 36 through refractory insulated line 46, and mix and burn with gases from line 18 in afterburner 20. Hot products of combustion leave afterburner 20 and enter a furnace (not shown).

This preferred embodiment provides an energy output of 10,000,000 BTU per hour. Input flow rates are 930 pounds per hour of coal transport air, 1380 pounds per hour of bleed air, and 9010 pounds (130% of stoichiometric) of combustion air. Lines are of piping as follows:

| Line No. | Standard Pipe Size/I.D. Nonstandard (Inches) |
|---|---|
| 10 | 2 (standard) |
| 14 | 10 (I.D. nonstandard) |
| 18 | 6 (I.D. nonstandard) |
| 22 | 2 (I.D. nonstandard) |
| 24 | 1¼ (I.D. nonstandard) |
| 26 | 2 (I.D. nonstandard) |
| 30 | 8 (I.D. nonstandard) |
| 34 | 22 (I.D. nonstandard) |
| 40 | 2 (I.D. nonstandard) |
| 42 | 2 (I.D. nonstandard) |
| 44 | ¾ (I.D. nonstandard) |
| 46 | 12 (I.D. nonstandard) |

Only enough air is provided in the pyrolyzer to bring its temperature to 1600° F., below the fusion point of the ash of the particular coal.

Temperature in the upper zone of the fast fluidized-bed combustor 28 is held at 1570° F. (In both the pyrolyzer and the fluidized-bed combustor temperature is maintained by a sensor working with a controller to regulate air flow to the respective unit.) If the temperature in the pyrolyzer falls unduly, less volatiles are produced; this means more combustion in the fluidiized-bed combustor, with consequent increased necessary excess air there and thus overall lower temperature at the afterburner. Also, unduly lower temperature in the pyrolyzer causes less fuel-nitrogen compound breakdown, compromising what is otherwise one of the advantages of my invention—making possible burning coal with low production of $NO_x$ compounds. On the other hand, unduly high temperatures in the pyrolzer and fluidized-bed combustor result in undesirable slagging and structural problems. Unduly high temperature in the fluidized-bed combustor also causes excess limestone use. Unduly low temperatures in the fluidized-bed combustor both cause excess limestone use and require use of more excess air, and thus lower afterburner temperature undesirably. Detailed flow rate data and transport air quantities are shown in the chart of FIG. 2.

To start up, when a thermostat moves to call for heat, the pneumatic air transport compressor and the air blower turn on. The compressor purges lines during preheating, while the blower blows air through the preheaters. Three preheaters (not shown), one for each of the pyrolyzer 12, char cyclone 16, and fluidized-bed combustor 28 are then turned on (unless a thermocouple, carried by each of them, in one or more of them senses that the respective element is still hot from a recent run). Each turns off when the component it is heating reaches the predetermined temperature (minimum operating temperature), 1200° F. Gas temperatures out of preheaters are 1300° F. into the pyrolyzer and fluidized-bed combustor and 1800° F. into the char cyclone. When the elements are up to temperature, coal and limestone feed is begun. Blower air is then redirected from the preheaters to the pyrolyzer and the fluidized-bed combustor. Blower air at room temperature is also introduced (not shown) into line 18, just downstream of char cyclone 16, and with volatiles (not shown) at the entrance of line 18 to heat it. (This prevents unwanted condensation, as well as unwanted soot build-up, in line 18.) When the downstream end of line 18 reaches its minimum operating temperature of 1000° F., as indicated by a thermocouple, air to line 18 is shut off.

Lines 24 and 44 are water-cooled.

When the system is shut down the compressor runs for a short further time, to make sure lines are clear.

Many variations within the spirit and scope of my invention will be apparent to those skilled in the art. Thus, as examples only, the char burner may be a slow fluidized-bed combustor or a gas-turbine-type (dilute phase) combustor. Again, if low-sulfur coal is used, a single-zone combustor, for example, can be run at ash agglomerating temperatures (from 1900° F. to 2200° F.), causing agglomeration and permitting efficient flyash removal by cyclone. A fines separator may be added to the system downstream of the ash cyclone and upstream of the afterburner (a sand bed filter) or downstream of the furnace or boiler (various low-temperature filters). A desulfurizing chamber may be added, also, as a separate piece of equipment, downstream of the agglomerating combustor, both upstream of the char cyclone. Pyrolysis could be achieved by recycling some hot products rather than directly from a part of the coal, as in the preferred embodiment. Any coal of rank hvAb or lower may be used. Or, cooling air or water could be used through a heat exchanger at the combustor rather than added as combustion air. The sorbent material for the capture of sulfur compounds may be lime, half-calcined limestone, or dolomite, rather than limestone. Fluxes may be mixed with the feed to the pyrolyzer or char burner to lower the ash fusion point; soda ash ($Na_2O$), borax ($B_2O_3$), or potash ($K_2O$) may be added to reduce the fusion temperature, thereby increasing the tendency to agglomerate and improve collection efficiency. Conversely, addition of silica will increase the fusion point, is desired to prevent slagging. If desired, diluent gases, such as steam or recirculated products of combustion, may be added to line 14, to reduce hydrocarbon concentration in line 14 and downstream elements, thereby inhibiting the cracking of saturated hydrocarbons and fouling. Water may be added to the pyrolyzer to gasify some of the char, principally by the steam-carbon reaction ($H_2O + C \rightarrow CO + H_2$). This reduces char to the char burner and increases volatiles to afterburner 20. This reduces needed combustion air (through line 30), and makes possible adding preheated air to afterburner 20. This reduces system fuel consumption and increases the flame temperature and furnace output, permits use of coals with lower volatile-matter content without reducing outlet flame temperature, and allows the use of water slurry coal feed—which simplifies coal handling, storage, and transportation—, and eliminates the need for coal drying, and reduces system size and cost, — since the combustion air added at the afterburner bypasses reactors and cyclone).

If, as mined, the coal contains pyrite in amount to give a sulfur content over three percent, any excess thereover is removed, at the mine.

Figure 3:
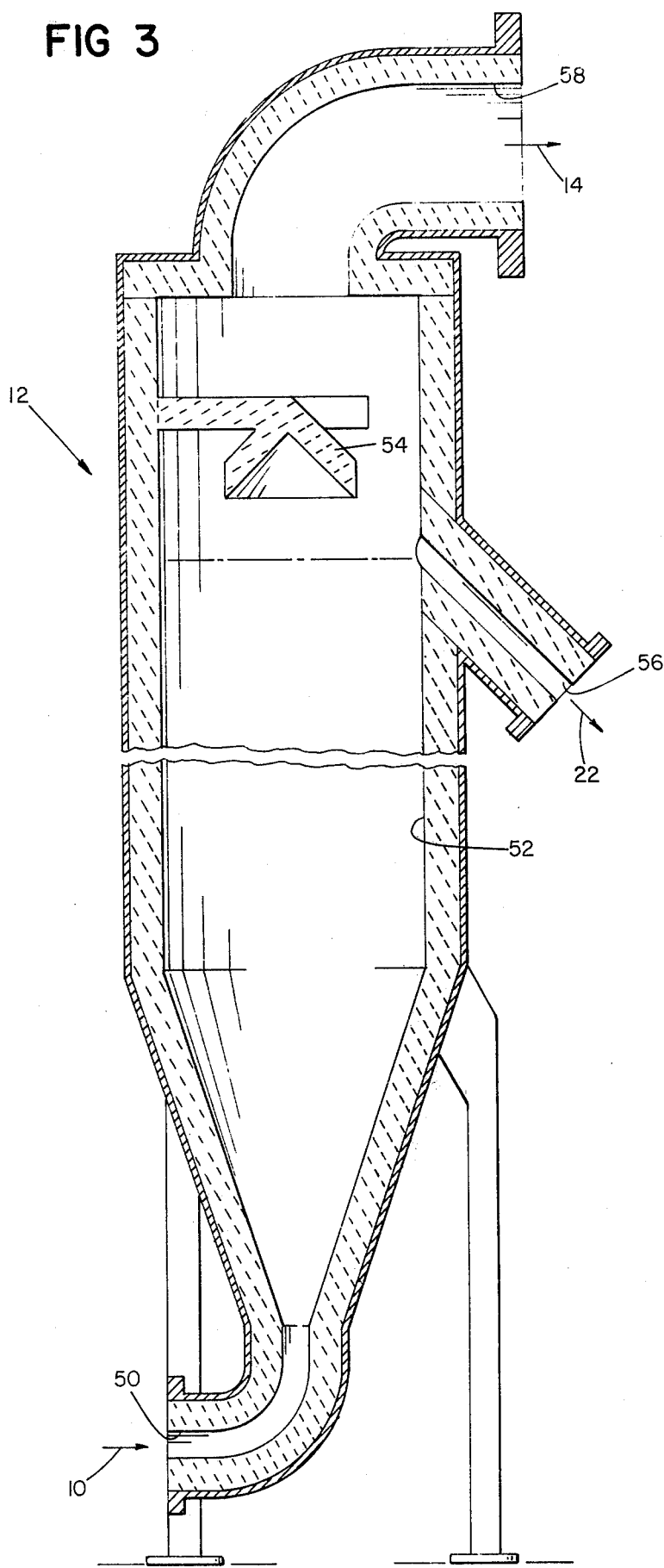
FIG. 3 is the preferred embodiment of pyrolyzer used therein, shown in vertical section.

Turning now to a description of each of the elements of FIG. 1 in more detail, there is shown in FIG. 3 pyrolyzer 12, comprising inlet 50, tank 52, deflector 54, standpipe outlet 56, and upper outlet 58. Pyrolyzer 12 is 12 feet 7 inches high; inlet 50 is 2 inches ID; tank 52 is 2 inches ID at its connection with inlet 50 and widens to a 2 foot ID at its main cylindrical portion; standpipe outlet 56 is 2 inches ID; and upper outlet 58 is 10 inches ID. Pyrolyzer 12 is refractory lined ($T_{max}=1800°$ F. for tank 52), and has an outer wall of carbon steel.

In operation, the pyrolyzer 12 is first filled with powdered material. In a new system, the material may be any non-melting substance such as sand; after run-up, the char and limestone from the previous run is used instead.

The pyrolyzer contents and walls are heated during start-up by combustion products entering at inlet pipe 10, as has been previously described. When the temperature in pyrolyzer 12 is brought to 1200° F. by preheating as previously described, coal, limestone, transport air, and bleed air enter inlet 50 from line 10. Conical deflector 54 prevents, on start-up, jetting of the feed materials through tank 52 and out through outlet 58. The feed materials accumulate within tank 52 by virtue of the spouted fluidized bed created by interaction of the incoming stream transport air, coal, limestone, and bleed air on the char and limestone. Thus the feed spouts up the center of tank 52. Char produced by pyrolysis, along with the limestone, circulates by flowing downward in the annulus, then being entrained at the bottom of tank 52 by the incoming stream, before showering back to the annulus. Pyrolysis of the coal occurs as the incoming particles of coal are heated by the recirculating char and limestone. Each particle of incoming coal is immediately surrounded by several particles of inert, non-sticky, char and limestone. (This is important if the incoming coal is of the caking type; without the dilution effect, the incoming coal would agglutinate into a large lump. The narrowness of the cone, of only 20°, helps promote the rapid mixing of recirculating solids with incoming coal.) Combustion of the incoming air with the coal, char, and volatile matter heats the solid materials in the pyrolyzer by combustion; only enough air is supplied to create 1600° F. Lime (the reaction products of which are elsewhere herein referred to as "spent limestone") produced from the thus-calcined limestone reacts with the emitted sulfur compounds in the volatiles (primarily $H_2S$), thereby scrubbing the gas stream while forming spent sorbent, primarily CaS (calcium sufide).

The char and spent limestone pass through standpipe 56 to line 24 and then to combustor 28, as above described. Gaseous products and entrained char and limestone fines pass out through upper outlet 58, through line 14 to char cyclone 16.

Char cyclone 16 is quite standard cyclone separator designed for highly efficient removal of the entrained particles from the gases leaving pyrolyzer 12. Gases with a velocity of 50 feet per second enter tangentially into the side of the cyclone adjacent its wider top; particles are whirled to the outside, and spin downwardly until they fall through an outlet in the bottom connected to line 26. Transport air (from a compressor not shown) keeps the particles moving out of cyclone 16 and through lines 26 and 22 by ejector action. Cleaned gases leave through an outlet in the top of the cyclone connected to line 18. Cyclone 16 is 14 feet high, is 28.8 inches at its widest ID, and is lined with ¾inch refractory-filled hexagonal steel honeycomb ($T_{max}=1800°$ F.) anchored with studs, surrounded by 3 inch heat insulating refractory and an outer carbon steel casing.

Figure 4:
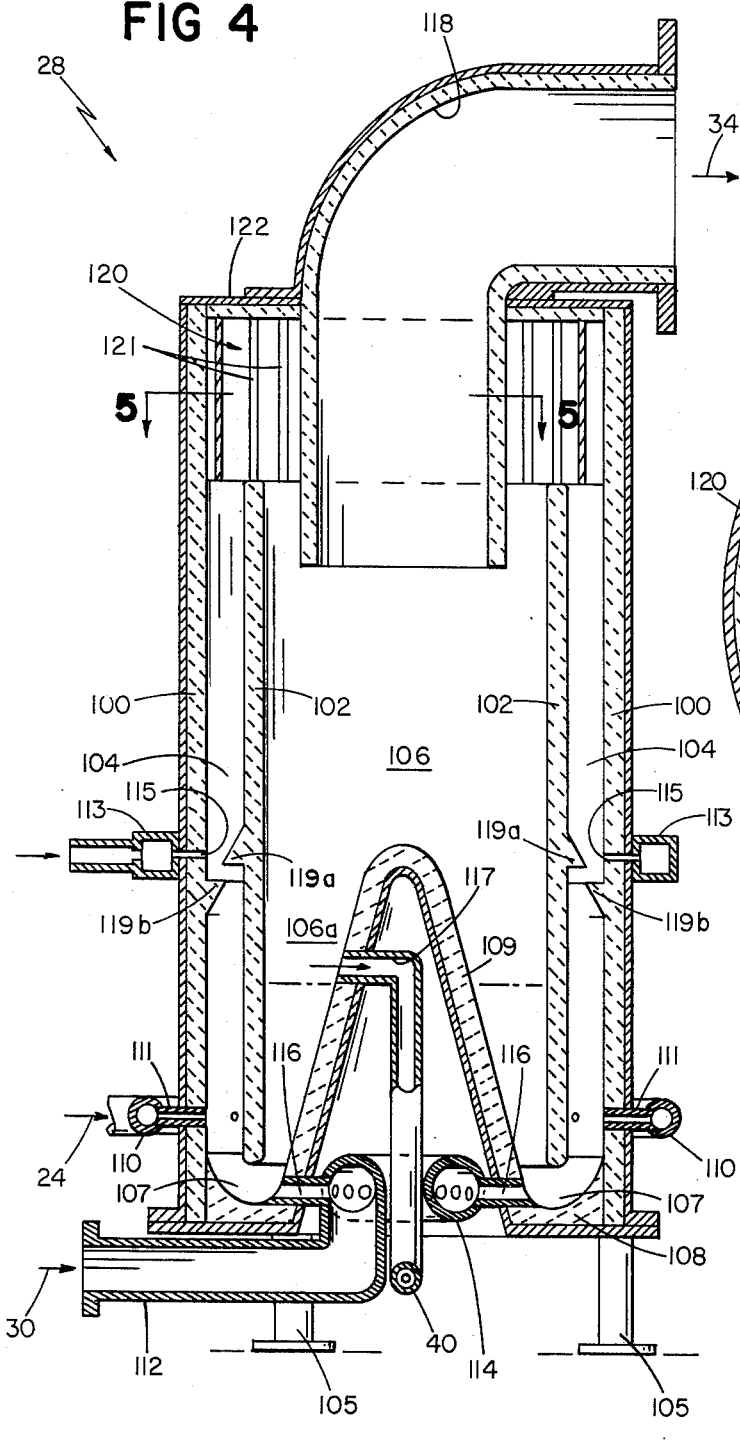
FIG. 4 is a vertical section of the preferred embodiment of fluidized bed combustor for use therein.
Figure 5:
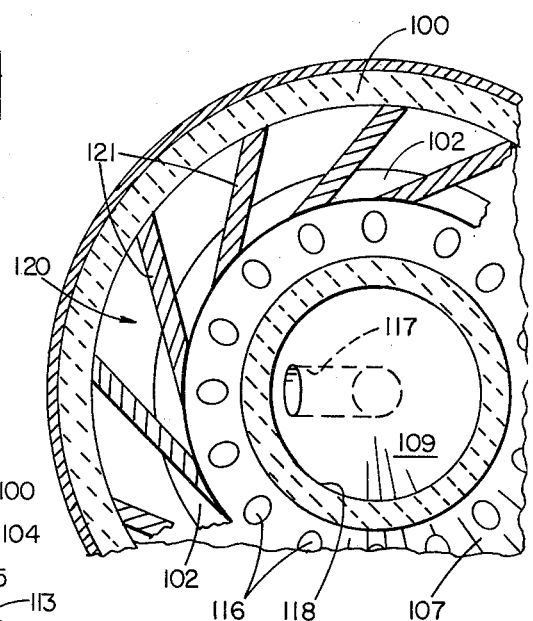
FIG. 5 is a partial sectional view taken at 5—5 of FIG. 4.

Char and limestone from line 24 enter fast (Squires, "Studies Toward Improved Techniques for Gasifying Coal," proposal for continuation of NSF grant GI-34286A-1 (C.C.N.Y., December, 1974)) fluidized-bed combustor 28 (FIG. 4), where combustion of the char takes place. Combustor 28 comprises concentric tubes 100 and 102, which form the main body of the combustor and define both annular burner zone 104 between the tubes and inner chamber 106 within tube 102. Combustor base 108, mounted on struts 105, has hollow conical portion 109 projecting upward into chamber 106, a tapered annulus 106a thereby being defined between tube 102 and conical portion 109. Annulus 104 is divided into a lower fast fluidized bed ash-agglomerating combustion zone at 2000° F. and an upper fast fluidized bed desulfurizing zone at 1570° F. by air entering manifold 113 and through circumferential slot 115 into annular zone 104. Deflector rings 119a and 119b prevent solids backflow and assist in defining the two zones. Tube 102 is spaced above base 108 to define, at the bottom of combustor 28, zone 107, which connects zone 104 with annulus 106a and chamber 106. Circular char inlet manifold 110 connects line 24 to burner zone 104 by eighteen tubes 111 (½ inch ID) fitted through holes in the walls of tube 100 and spaced circumferentially thereabout. Air inlet 112 (8 inches ID) connects line 30 with circular manifold 114, located within conical portion 109 near its bottom, and manifold 114 in turn is connected by 24 circumferentially spaced ejector tubes 116 (1 ½ inches ID) to zone 107, ejector tubes 116 being fitted through holes in conical portion 109. Also fitted through conical portion 109 is ash outlet pipe 117, which connects annular zone 106a near the top of conical portion 109 with standpipe 40. Flue 118 (22 inches ID) connects chamber 106 with line 34. Connecting burner zone 104 and chamber 106 at the top of combustor 28 is vaned separator 120, which has twelve equally spaced (75°) vanes 121 (FIG. 5). Combustor cover 122 overlies separator 120 and tube 102, connected at its top to separator 120.

As to dimensions and materials, combustor 28 is 17 feet 8 inches high; tube 100 is 6 feet O.D.; burner zone 104 is 7 inches wide; chamber 106 is 45 inches inside diameter; struts 105 are 18 inches high; the lower edge of ash outlet pipe 117, where it is fitted through conical portion 109, stands 4.8 feet high; to the top of combustor cover 122, combustor 28 stands 13 feet 7 inches high. Vanes 121 are 2 inches thick. Tube 100 has an outer steel casing (¼ inch thick), which surrounds a 3 inch thick castable refractory, which in turn surrounds a ¾ inch refractory-filled hexagonal steel honeycomb. Tube 102 is composed of an outer wall of ¾ inch refractory-filed hexagonal steel honeycomb and an inner wall of the same ¾ inch refractory. Between the inner and outer honeycombs is 3/16 inch thick steel tube running the length of tube 102 and welded to the honeycombs on 6 inch centers. Slot 115 is 3/16 inch.

In operation, preheating of combustor 28 is accomplished, as above described, with preheated air entering through inlet 112 to bring combustor 28 to 1200° F. Combustion air from blower 32 then directly passes to combustor 28 through inlet 112. Char and limestone from pyrolyzer 12 and char cyclone 16, carried by transport air, enter manifold 110 from line 24, and are distributed through tubes 111 into the bottom portion of burner zone 104. Air blown from inlet 112 into manifold 114 distributes through ejector nozzles 116 into zone 107, and from there sweeps char and limestone upward through burner zone 104. Combustion begins in zone 104, ignited by the heat of recirculating solids. Combustion continues in an upward direction through zone 104 in the form of a fast fluidized bed composed of char, limestone, and combustion air. The products of combustion move upwards with a superficial velocity of 18 feet per second. Products of combustion, excess oxygen, and unburned char rise up to separator 120, which, in conjunction with chamber 106, acting as a conventional cyclone separator, causes the oncoming mass of solids and gases to swirl. Swirling solids comprising ash, spent limestone, and some unburned char enter chamber 106 and fall along the inner walls of tube 102 into tapered annulus 106a. The swirling action assures that only very small particles of ash and still-burning coal can escape from the burner. (It has been observed in conventional coal burners of many types—including slow-fluidized beds—that stillburning coal particles emerging from the bed are much hotter than the average bed temperature, and, in fact, are hot enough to become sticky due to ash melting. A freeboard must customarily be provided over slow fluidized beds, to permit burnout of these particles before they reach any surface. By using centrifugal action, to reduce escaping-particle size, the freeboard volume—and total burner volume—are reduced about ⅞, compared with conventional burners.)

The ejector action caused by air flow from properly dimensioned ejector tubes 116 draws some of the first to fall solids out through zone 107 and recirculates them back up through zone 104 for burning of any unburned char. In spite of the ejector action, solids so accumulate in annulus 106a in the form of a slow fluidized bed. When the bed reaches the level of ash outlet pipe 117, pipe 117 acts as a weir to draw off the excess solids, made up of ash and spent limestone, and carry them down to standpipe 40; from there the solids go to line 44, and finally are flushed out by transport air, to an ash hopper (not shown). It should be noted that the above described ejector action prevents solid particles from flowing in the wrong direction, namely, down annulus 104 and up passages 106a and 106; some of the air from nozzles 116 flows upward through annulus 106a, however, thereby keeping this region fluidized. Added nozzles through conical section 109 (not shown) can supplement this fluidizing action, if necessary.

If preferred, the slow fluidized bed may be eliminated by moving the opening of standpipe 117 down to the same level as elements 116, and making it large enough to prevent buildup of a bed of solids.

The maintenance of a stoichiometric excess of air in combustor 28 holds combustor temperature at 1570° F., which is the temperature at which desulfurification by limestone occurs with the least use of the sorbent. Yet it is desirable to operate a portion of the annulus 104 at a higher temperature, 2000° F., in order to maximize the agglomeration of fine flyash particles. It becomes desirable to operate burner 28 with two temperature zones, the lower zone at the higher temperature. Yet fast-fluidized beds are known for their uniformity of temperature, due to the extensive vertical agitation of the solids. The two zones are created by placement of a fluid-dynamic check valve, placed in the middle of annulus 104. The opposing rings forming the check valve retard slippage of solids by mechanically blocking their flow. The check flow action is enhanced by the introduction of the air stream through slot 115, which air is also used to cool the gases from the optimum ash-agglomerating temperature (2000° F.) to the optimum desulfurification temperature (1570° F.). The relative amount of air entering through air inlet 112 and slot 115 is controlled by two temperature sensors, one in each annular fast fluidized bed zone; a sensor in the lower zone regulates air through air inlet 112 to fix lower zone temperature at 2000° F., and a sensor in the upper zone regulates air through slot 115 to maintain the proper upper zone temperature.

The check value is not required when burning low-sulfur coal. Some agglomeration occurs, in addition, even at 1570° F., particularly if a flux such as borax or soda ash is added to the fuel, even in the absence of a check valve.

Similar to char cyclone 16 is ash cyclone 36, two of which connected in parallel I use in my presently preferred embodiment. Ash cyclone 36 is a quite standard cyclone separator proportioned for highly efficient particle removal, and is composed of generally the same materials for refractory and casing as is cyclone 16. Cyclone 36 is 15 feet 10 inches high, 35 inches at its widest ID, and has a tangential inlet on its side near the top. Upper and lower outlet configurations are substantially the same as in cyclone 16. In operation, hot gases from combustor 28 having an inlet velocity of 75 feet per second enter through the tangential inlet. Ash and spent limestone are centrifugally whirled, fall downward, and finally pass through the bottom outlet connected to line 42 and then to line 44. Transport air flushes these solid products out through lines 42 and 44. Clean combustion gases (1570° F.) leave by the top outlet, and pass through line 46 to afterburner 20.

Receiving clean combustible gases from char cyclone 16 through line 18 and clean combustion gases as well as nitrogen and remaining oxygen from ash cyclones 36 through line 46 is afterburner 20 (FIG. 6). Gases from line 46 pass axially into cylindrical afterburner 20 through inlet 130 (1.0 feet I.D.). Gases from line 18 under pressure enter tangentially through inlet 132 (6 inches ID) into annular chamber 134, from which they are uniformly introduced radially into the flow of gases from inlet 130 for even mixing thereof by distributor 136, a ring having a series of circumferential ports 136a fitted within after-burner 20 downstream of inlet 130 and concentrically within annular chamber 134. In operation, gases from inlets 130 and 132 are hot enough to initiate combustion in combustion chamber 138 between the combustible gases from inlet 132 and the unconsumed oxygen from inlet 130.

The afterburner 20 discharged directly into a furnace (not shown), through a 24 inch diameter opening. Afterburner 20 is fitted into a hole in the furnace wall, by attaching flange 142 to the furnace casing. In this configuration, combustion chamber 138 is 4 feet long. Alternatively, a flange 142a may be attached to the afterburner as shown, and attached to the furnace. In the latter case, the afterburner casing downstream of flange 142a is removed. In this configuration, combustion chamber 138 is 1.15 feet long. With the configuration of flange 142, combustion is essentially completed within the afterburner. With the configuration of flange 142a, combustion is completed within the furnace. The former configuration may improve the completeness of combustion, particularly with boilers and other furnaces where the walls are relatively cold. The latter configuration is more compact and is cheaper to build.

In addition, it may be desirable to add an oil-nozzle (not shown) near the upstream entrance of distributor 136 to provide a spray of oil. This oil will consume excess oxygen that would otherwise be contained in the exhaust gases, thereby raising their temperature, which in turn increases the furnace efficiency and output. Another benefit of oil addition is to be able to control, or trim, the outlet temperature, despite variations in the coal's volatile matter, that would cause the burner outlet temperature to vary. Yet another benefit of oil addition is that it permits the use of coals whose volatile matter content is lower than that required for a high flame temperature, but which may otherwise be desirable to use.

An element used in start-up, as described above, is preheater 150 (FIG. 7), two of one size being used for pyrolyzer 12 and char cyclone 16 and a larger one being used for combustor 28. For each start-up in which preheating is required, blower 32 blows air (60° F.) into each preheater 150 through inlet 152. The air passes into vaned chamber 154, where it separates, part flowing axially through center conduit 156, and part being swirled outwardly through vanes 155 (approximately 45°) into the annular space surrounding chamber 154 and then into combustion chamber 158. Natural gas is admitted through inlet 160 into manifold 162, and issues therefrom into the annular space surrounding chamber 154, thereby mixing with the swirling air and burning upon ignition initially by a spark plug (not shown) located in chamber 158. Air passing through conduit 156 is swirled by vortex generator 164, and, upon leaving conduit 156, mixes with the gases passing through chamber 158, which are products of combustion.

The air passing through vanes 155 is the primary air, and is approximately the amount required for complete combustion of the gas. The air entering through duct 156 is the secondary air, and is used to cool the products of combustion to the temperature needed to preheat. Without this cooling air, products of combustion leaving the burner 150 would be too hot, causing structural damage to the piping of lines 10, 14, and 30. Airflow through tube 156 also cools the tube, and prevents structural damage that would otherwise occur due to the heating by hot gases in combustion zone 158. Conduit 156 and chamber 158 are made of stainless steel. The smaller version of preheater 150 is 17 inches long, 3.07 inches ID (chamber 158), 1.20 inches ID (conduit 156—for pyrolyzer 12), 1.35 inches ID (conduit 156—for char cyclone 16); conduit 156 is 9.6 inches long, and chamber 154 is 0.4 inches long in the axial direction of preheater 150. Natural gas flow into inlet 160 is 200 standard cfh, and airflow into inlet 152 is 7200 standard cfh for pyrolyzer 12 and 4800 standard cfh for char cyclone 16. The larger version of preheater 150, for combustor 28, is 42 inches long, 6.06 inches ID (chamber 158), 2.65 inches ID (conduit 156); conduit 156 is 24.2 inches long, and chamber 154 is 0.8 inches long in the axial direction of preheater 150. Natural gas flow into inlet 160 is 1000 standard cfh, and airflow into inlet 152 is 36,000 standard cfh. The heated air passes from outlets 166, and enters pyrolyzer 12, char cyclone 16, and fluid bed combustor 28 in their usual air entrances.

Figure 8:
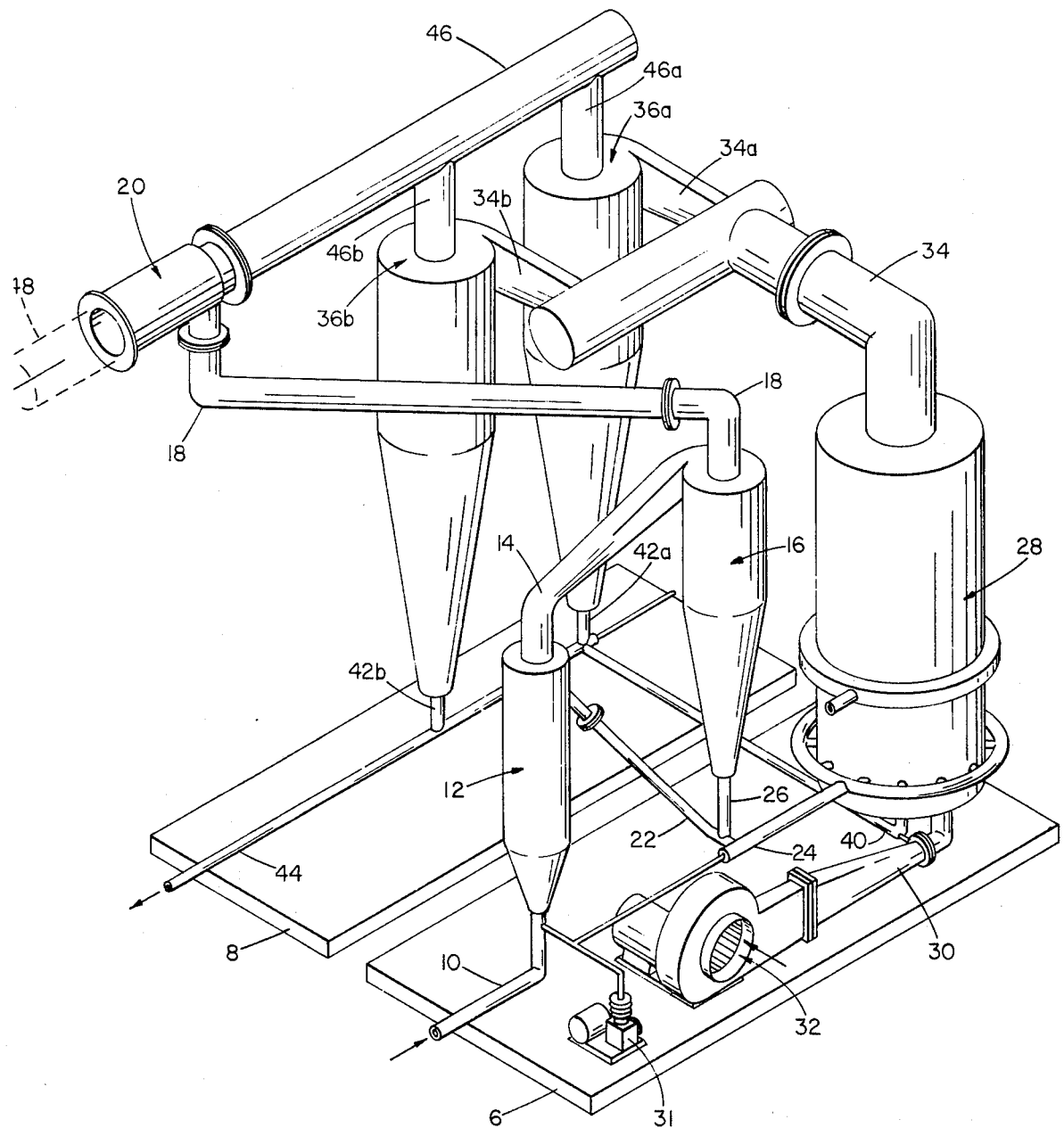
FIG. 8 is a somewhat diagrammatic view in perspective of the preferred embodiment of the invention.

Finally, there is shown in FIG. 8 a burner station such as could be used in a factory or power plant. Preheaters 150 are not shown in this figure. A compressor 31 is shown adjacent blower 32. The various elements are mounted on foundations 6 and 8 (braces and other supports not shown). A system of valves (not shown) can be used to coordinate coal, limestone, air, and water feeds for the station, an operator at a central control panel (not shown) effectively running the burner. Hoppers to store powdered coal, ash, and limestone are not shown.

Other embodiments within the following claims will occur to those skilled in the art.

What is claimed is:

1. Coal burning apparatus which comprises, in combination:

a spouted fluidized bed pyrolyzer,
a fluidized bed combustor, a first cyclone, a second cyclone, and an afterburner, means for introducing pulverized coal and sorbent into said pyrolyzer, means for transferring char and sorbent from said pyrolyzer to said combustor, means for transferring gaseous materials with entrained particulate material from said pyrolyzer to said first cyclone, means for transferring gaseous materials from said first cyclone to said afterburner, means for introducing a combustion supporting gas into said combustor in quantity sufficient to maintain a temperature of combustion products below the fusion temperature of ash from the char, means for transferring gaseous materials with entrained particulate material from said combustor to said second cyclone, and means for transferring gaseous materials from said second cyclone to said afterburner.

2. The apparatus of claim 1 in which said fluidizedbed combustor is of fast, solids-recirculating, character.

3. Coal burning apparatus which comprises, in combination:

a spouted fluidized bed pyrolyzer, a fluidized bed combustor, a first cyclone, a second cyclone, and an afterburner, the pyrolyzer being connected to accept pulverized coal and to discharge char to the combustor and gaseous materials with entrained particulate material to the first cyclone.

the first cyclone being connected to deliver gases to the afterburner, the combustor being connected to accept also a combustion supporting gas and to deliver to the second cyclone gaseous materials with entrained particulate material, and the second cyclone being connected to deliver gaseous material to the afterburner, said pyrolyzer comprises a lower entrance passage progressively changing in direction from transverse to longitudinal, a cylindrical chamber portion defined by a line rotated about the longitudinal axis of said pyrolyzer, a conical transition portion between said entrance passage and said cylindrical chamber portion, an outlet passage of smaller diameter than said cylindrical chamber portion above said cylindrical chamber portion, a deflector positioned in said cylindrical chamber portion to bar flow directly along a parallel to said longitudinal axis from the lower portion of said cylindrical chamber portion into said outlet passage, and a standpipe emerging from said cylindrical chamber portion upstream of said deflector.

4. Coal burning apparatus which comprises, in combination:

a spouted fluidized bed pyrolyzer, a fluidized bed combustor, a first cyclone, a second cyclone, and an afterburner, the pyrolyzer being connected to accept pulverized coal and to discharge char to the combustor and gaseous materials with entrained particulate material to the first cyclone, the first cyclone being connected to deliver gases to the afterburner, the combustor being connected to accept also a combustion supporting gas and to deliver to the second cyclone gaseous materials with entrained particulate material, and the second cyclone being connected to deliver gaseous material to the afterburner, said fluidized-bed combustor being of fast, solids-recirculating character and said combustor includes a central recirculation chamber defined by a first portion cylindrical about the combustor longitudinal axis and a generally conical portion, an annular fast fluidized-bed chamber positioned around said central recirculation chamber, said central recirculation chamber and said fast fluidized-bed chamber communicating beneath said first portion, said first portion defining with said generally conical portion a central recirculation chamber annulus, said generally conical portion being provided therethrough with a multiplicity of air jets, and said fast fluidized-bed chamber being provided therethrough around a lower periphery thereof with a multiplicity of char inlet passages.

5. The apparatus of claim 4 in which said central recirculation chamber and said fast fluidized-bed chamber communicate at their opposite ends around the other end of said first portion through a multiplicity of vanes angled to provide materials moving from said fast fluidized-bed chamber to said central recirculation chamber with a centrifugal movement to throw solids toward the inner wall of said first portion, and said generally conical portion includes a withdrawal standpipe.

6. The apparatus of claim 4 in which said air jets promote circulation from said central recirculation chamber to said fast fluidized-bed chamber.

7. The apparatus of claim 4 in which said fast fluidized-bed chamber is divided into a lower agglomerating chamber and an upper desulfurizing chamber.

8. The apparatus of claim 7 in which said agglomerating chamber and said desulfurizing chamber are separated by a fluid dynamic check valve.

9. The method of burning coal which comprises the steps of introducing pulverized coal and sorbent into a fluidized bed pyrolyzer, carrying out in said pyrolyzer a reaction to produce char, desulfurized volatiles, and sulfur-bearing sorbent containing sulfur taken from said volatiles, separating the char and sorbent from the desulfurized volatiles, introducing the char and sulfur-bearing sorbent into a fluidized bed burner, introducing into the burner a stoichiometric excess of air, said excess of air being chosen to produce an ash temperature below the fusion temperature thereof, burning the char in contact with the sulfur-bearing sorbent and in heat-transfer relationship with the stoichiometric excess of air, forming thereby dry ash, a desulfurized mixture of gases, and sorbent-bearing sulfur in increased amount, separating said mixture of gases from said ash, and burning said desulfurized volatiles in said desulfurized mixture of gases.

10. The method of claim 9 in which said stoichiometric excess of air is brought into physical contact with said char.

11. The method of claim 9 in which said pyrolyzer is heated by burning a portion of the combustibles introduced thereinto.

12. The method of claim 9 in which a diluent gas is added to said volatiles before burning said volatiles in said mixture of gases.

13. The method of claim 9 in which $H_2O$ is added at said pyrolyzer.

14. The method of claim 13 in which preheated air is added in burning said volatiles.

15. The method of claim 9 in which said coal is Illinois high volatile bituminous Grade B, and said ash temperature is 1600° F.

16. The apparatus of claim 1 in which said pyrolyzer is a solids recirculating device.

17. The apparatus of claim 1 in which said combustor includes a collector therein.

18. The apparatus of claim 1 in which ejector means promote recirculation in said combustor.

19. The apparatus of claim 1 in which said pyrolyzer includes a standpipe for removal therefrom therethrough of char.

20. The apparatus of claim 1 in which hot particles recirculated into a portion of said combustor adjacent an outlet thereof are passed over vanes positioned therearound to provide a whirling motion and reduce needed freeboard to prevent escape of too-hot particles.

* * * * *